(12) United States Patent
Gwen

(10) Patent No.: US 9,169,055 B1
(45) Date of Patent: Oct. 27, 2015

(54) DESICCANT CONTAINER

(71) Applicant: Patrick Gwen, Houston, TX (US)

(72) Inventor: Patrick Gwen, Houston, TX (US)

( * ) Notice: Subject to any disclaimer, the term of this patent is extended or adjusted under 35 U.S.C. 154(b) by 17 days.

(21) Appl. No.: 14/265,585

(22) Filed: Apr. 30, 2014

(51) Int. Cl.
| | |
|---|---|
| *B65D 75/30* | (2006.01) |
| *B65D 81/26* | (2006.01) |
| *B65D 25/06* | (2006.01) |
| *B65D 25/22* | (2006.01) |
| *B65D 25/38* | (2006.01) |
| *B65D 41/00* | (2006.01) |

(52) U.S. Cl.
CPC .............. *B65D 81/266* (2013.01); *B65D 25/06* (2013.01); *B65D 25/22* (2013.01); *B65D 25/38* (2013.01); *B65D 41/005* (2013.01)

(58) Field of Classification Search
CPC ..... A61L 2/206; B65D 81/3261; B65D 75/30
USPC .............. 206/204; 220/528; 383/38, 100, 102, 383/22, 23
See application file for complete search history.

(56) References Cited

U.S. PATENT DOCUMENTS

| | | | | |
|---|---|---|---|---|
| 2,592,162 | A * | 4/1952 | Luce | 222/190 |
| 3,142,830 | A | 7/1964 | Esposito et al. | |
| 3,762,404 | A * | 10/1973 | Sakita | 602/6 |
| 4,388,739 | A * | 6/1983 | Martinon et al. | 8/150 |
| 6,234,675 | B1 * | 5/2001 | Saad et al. | 383/38 |
| 6,767,131 | B2 * | 7/2004 | Taheri | 383/63 |
| 2006/0257054 | A1 * | 11/2006 | Henn et al. | 383/38 |
| 2009/0175563 | A1 * | 7/2009 | Weaver | 383/38 |
| 2009/0200198 | A1 * | 8/2009 | Guelzow et al. | 206/570 |
| 2013/0213828 | A1 * | 8/2013 | Chatterjee et al. | 206/204 |
| 2013/0269293 | A1 * | 10/2013 | Dowling | 53/420 |

\* cited by examiner

*Primary Examiner* — Steven A. Reynolds
*Assistant Examiner* — King M Chu
(74) *Attorney, Agent, or Firm* — Andrew W. Chu; Craft Chu PLLC

(57) ABSTRACT

The container for storing a desiccant material includes a flexible housing having a front panel, a back panel, a sealed end, and an opened end. The side edges of the front panel attach to side edges of the back panel so as to form a sleeve. An insert member mounted within the sleeve forms a first chamber and a second chamber. The desiccant material is stored in the first chamber, and water absorbed from the atmosphere is collected in the second chamber. A drain connects the first chamber and the second chamber through the insert member. The top of the first chamber can have a lid member and vapor permeable membrane for exposing the desiccant material of the first chamber to the atmosphere. A retractable hook in the lid member supports the container when hanging. The container is foldable and flexible for convenient storage for re-use or disposal.

20 Claims, 2 Drawing Sheets

DESICCANT CONTAINER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a container for storing a desiccant material. More particularly, the present invention relates to desiccant container with a chamber to store the desiccant material and a separate chamber to hold water collected by the desiccant material. Even more particularly, the present invention relates to a desiccant container that is flexible and collapsible.

2. Description of Related Art Including Information Disclosed Under 37 CFR 1.97 and 37 CFR 1.98

Hygroscopic substances can absorb water and water vapor to maintain a dry environment. A desiccant or desiccant material is a well known hygroscopic substance used to absorb water and water vapor in enclosed spaces. For a small space, such as a medicine bottle, a packet of silica gel absorbs moisture to maintain the integrity of pills stored in the bottle. For a large space, such as a basement room of a house, a package of calcium sulfate can be suspended in the air within the room to reduce humidity in the atmosphere of the room. Other desiccants include activated charcoal, and calcium chloride.

The basic container for desiccant includes a housing and a vapor permeable membrane. The housing and membrane hold the desiccant in place, while the membrane exposes the desiccant to moisture in the atmosphere. The desiccant collects water, while remaining contained in the housing. The housing allows placement of the desiccant in various locations within the room or other enclosed space. There are known containers, such as jars to set upon counters and pouches to hang from a horizontal closet rod.

Many simple versions of a desiccant container are known. U.S. Pat. No. 2,592,162, issued to Luce on Apr. 8, 1952, discloses a hanging container for desiccant material suspended in the air. U.S. Pat. No. 3,142,830, issued to Esposito et al on Jul. 28, 1964, describes a container with an indicator for saturation of the desiccant material inside the container. The container is a traditional model for setting on a counter or shelf. Various specialized containers are disclosed for limited applications, such as air flow through a motor vehicle air conditioning system and coatings for packaging.

More recent publications related to specialized desiccant containers. U.S. Publication No. 20130269293, published for Dowling on Oct. 17, 2013, describes a container for protein powder in a sealed jar. U.S. Publication No. 20130213828, published for Chatterjee et al on Aug. 22, 2013, discloses another specialized pill bottle with an attached structure to hold desiccant material.

Every desiccant container must still account for the collection of water. Some desiccants absorb and expand in volume, so the volume of the housing must accommodate this transformation of the desiccant. Other desiccants condense the water vapor into water and require a separate housing to store the water. The condensed water must be funneled away so that the desiccant can continue to collect. Furthermore, disposable desiccant can be expensive with purchasing new containers every time. For re-useable desiccant containers, the ability to maintain the capacity of the desiccant to absorb and removal of the water from the container are important considerations. The storage of a desiccant container for limited seasonal use can also affect the structure and form of the container.

It is an object of the present invention to provide an embodiment of a desiccant container to house desiccant in a flexible pouch.

It is an object of the present invention to provide an embodiment of a desiccant container with separate compartments for desiccant and water storage.

It is another object of the present invention to provide an embodiment of a desiccant container with a drainage connection to a water storage compartment.

It is still another object of the present invention to provide an embodiment of a desiccant container that is reuseable.

It is an object of the present invention to provide an embodiment of a desiccant container that is collapsible.

It is another object of the present invention to provide an embodiment of a desiccant container with a collapsible permeable membrane.

It is another object of the present invention to provide an embodiment of a desiccant container with removable perforated opening.

It is an object of the present invention to provide an embodiment of a desiccant container with an attachment for hanging the container.

These and other objectives and advantages of the present invention will become apparent from a reading of the attached specifications and appended claims.

SUMMARY OF THE INVENTION

Embodiments of the container for storing a desiccant material include a container comprising a flexible housing, an insert member, a drain means, a lid member, a vapor permeable membrane, and a hanging means. The flexible housing has a front panel, a back panel, a sealed end, and an opened end. The side edges of the front panel attach to side edges of the back panel so as to form a sleeve. There is the sealed end at a bottom of the sleeve and the opened end at a top of the sleeve so that the flexible housing a foldable and collapsible pouch or bag. The insert member is placed within the sleeve to define a first chamber and a second chamber within the sleeve. The first chamber stores the desiccant material, and the second chamber holds water collected by the desiccant material from the atmosphere.

The insert member generally separates the first and second chambers in sealed engagement to the sleeve. The insert member has an adjustable position within the sleeve to set different relative sizes of the first and second chamber. The desiccant material is prevented from spilling into the second chamber, and the water in the second chamber is prevented from leaking into the first chamber. The insert member can be formed by semi-rigid or rigid material.

A drain means in the insert member forms the fluid connection between the first chamber and the second chamber so that the water collected by the desiccant material in the first chamber is separated into the second chamber for storage. In some embodiments, the drain means comprises an inlet and an outlet. The inlet on the top surface of the insert member can be a perforated plate on the top surface, which retains the desiccant material in the first chamber. The outlet can be comprised of a collection chamber and a tubular member. The collection chamber maintains fluid connection with the perforated plate to channel any water into the tubular member. Water flows through the tubular member into the second chamber. There is a one way flow direction from the first chamber to the second chamber to prevent backflow of water into the desiccant material.

Embodiments of the top of the first chamber include a vapor permeable membrane and a lid member. The vapor permeable membrane is placed across the opened end of the sleeve to cover the first chamber. The lid member is also mounted within a top portion of the sleeve to cover and seal the first chamber. In some embodiments, the membrane is separate from the lid member and can fold into the first chamber with greater surface area to expose the desiccant material. In other embodiments, the membrane is more integral with the lid member and covers the lower surface of the lid member. The lid member can be formed by semi-rigid or rigid material. The lid member is in sealing engagement to the sleeve with a compatible cross-section for sealing the flexible housing.

There can also be a hanging means for suspending the container in a hanging position, such as hanging from a closet rod. Embodiments of the hanging means include a hook element pivotable between a first position and a second position. The first position extends upward from the lid member to allow for hanging the container. The second position retracts downward into the first chamber. There can also be a tab member extending downward from the lower surface of the lid member.

DETAILED DESCRIPTION OF THE DRAWINGS

Figure 1:
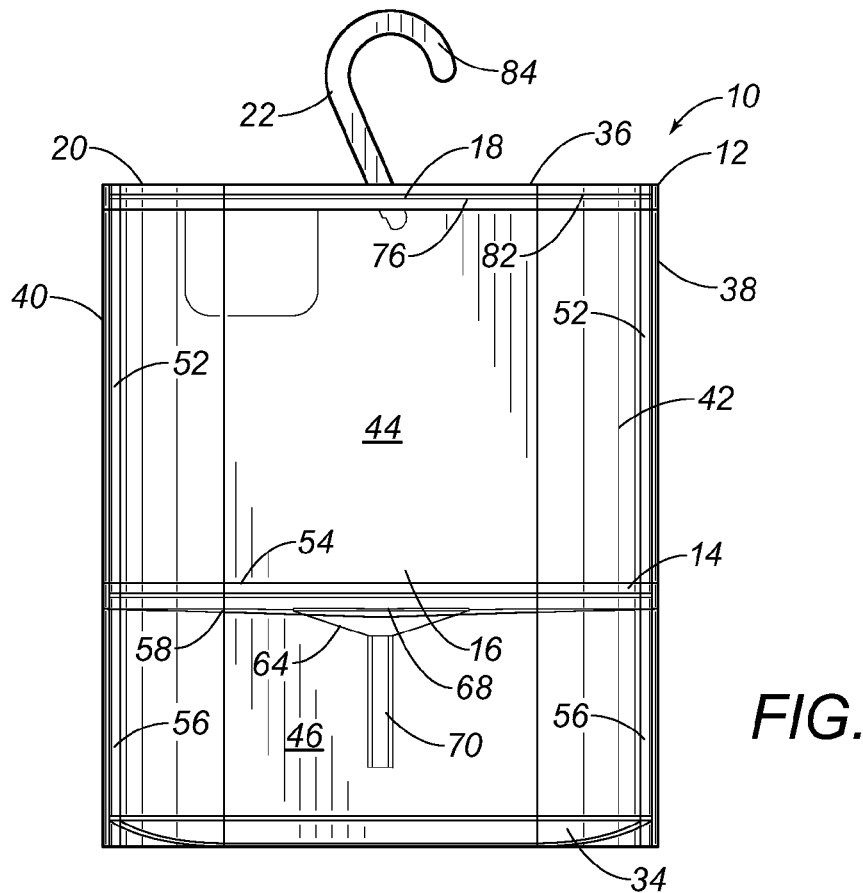
FIG. 1 is front elevation view of an embodiment of the container for storing a desiccant material, according to the present invention.

Referring to FIGS. 1-6, embodiments of the present invention include a container 10 for storing a desiccant material. The container 10 includes a flexible housing 12, an insert member 14, a drain means 16, a vapor permeable membrane 18, a lid member 20, and a hanging means 22. The flexible housing 12 has a front panel 30, a back panel 32, a sealed end 34, and an opened end 36. The side edges 38 of the front panel 30 attach to side edges 40 of the back panel 32 so as to form a sleeve 42. The sealed end 34 can be made integral with the front panel 30 and the back panel 32 at a bottom of the sleeve 42. The sealed end 34 can also be made from the same material as the front panel 30 and the back panel 32. A different thickness can be used for the sealed end 34 as well. The sealed end 34 is at a bottom of the sleeve 42, and the opened end 36 is at a top of the sleeve 42 so that the flexible housing 12 is like a pouch or bag. The flexible housing 12 is foldable, flexible and collapsible for storage and expanding to hold different amounts of desiccant material and collected water. The side edges 38 of the front panel 30 and the side edges 40 of the back panel 32 are affixed together by a heat seal, adhesive, or other sealing method.

Figure 2:
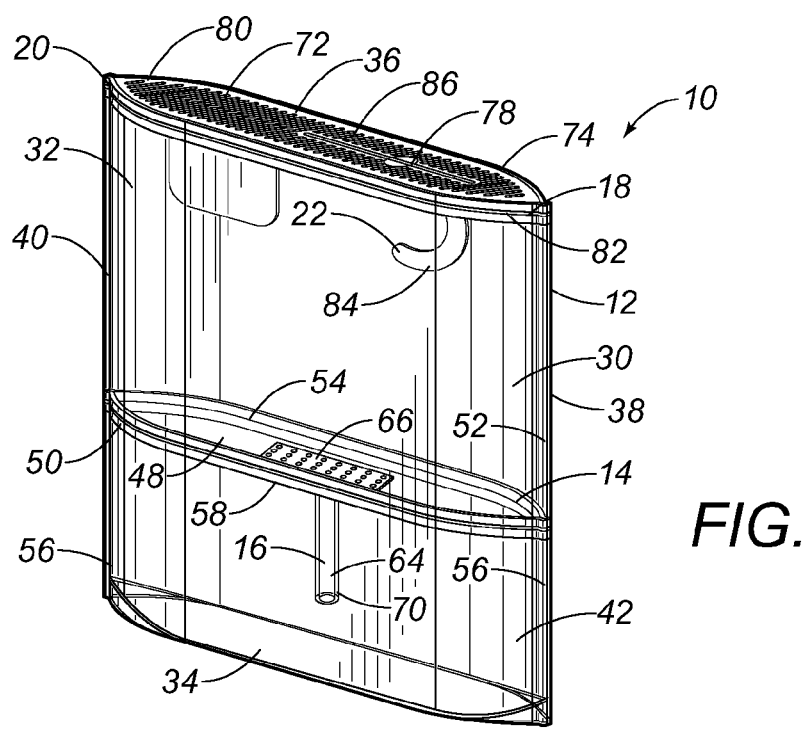
FIG. 2 is perspective view of an embodiment of the container for storing a desiccant material, according to the present invention.
Figure 6:
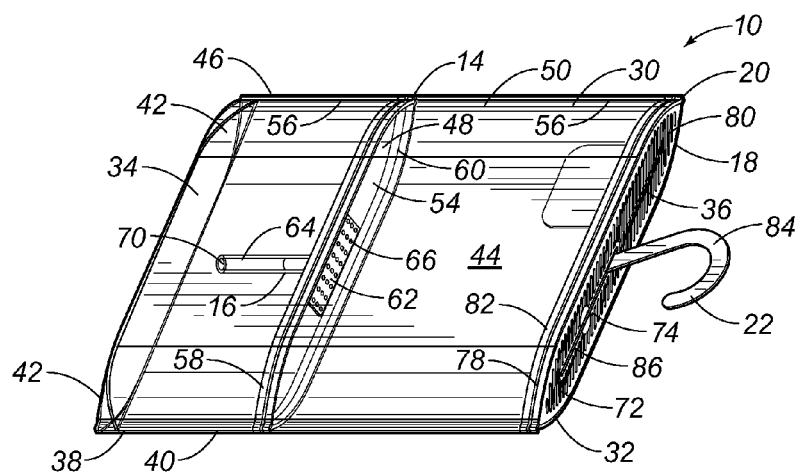
FIG. 6 is an upper perspective view of an embodiment of the container for storing a desiccant material, according to the present amendment.

In the present invention, there is the insert member 14 placed within the sleeve 42 so as to form a first chamber 44 and a second chamber 46 within the sleeve 42. The first chamber 44 holds the desiccant material, and the second chamber 46 holds water collected by the desiccant material. FIGS. 2 and 6 show the insert member 14 having a cross-section 48 corresponding to a cross-section 50 of the sleeve 42. The insert member 14 can be comprised of semi-rigid or rigid material. The insert member 14 can hold the shape of the cross-section of the sleeve 42. There is a sealing engagement of the insert member 14 to the sleeve 42 so that the first chamber 44 is separated from the second chamber 46. The sealed end 34 and the insert member 14 with compatible cross-sections hold the volume of the second chamber 46. The desiccant material remains separate from collected water in the second chamber 46. The insert member 14 can be removably mounted with adjustable positioning within the sleeve 42 so that the relative sizes of the first chamber 44 and the second chamber 46 can be modified according to user preferences. The amount of desiccant material and the amount of space needed to store the collected water can be set by the user. With the cross-sections of the insert member 14 and the sleeve 42 being compatible, the insert member 14 can be friction fit to the sleeve 42. With the cooperative cross-sections, the insert member 14 can be removably or permanently attached to the sleeve 42 by friction fit or other means. An adhesive or heat seal can more permanently attach the insert member 14. Other embodiments may include a different kind of attachment to set the first chamber 44 and the second chamber 46.

Referring to FIGS. 1-6, the first chamber 44 is formed by a top portion 52 of the sleeve 42, the opened end 36, and a top surface 54 of the insert member 14. The second chamber 46 is formed by a bottom portion 56 of the sleeve 42, the sealed end 34, and a bottom surface 58 of the insert member 14. The size of the chambers 44, 46 can be changed according to placement of the insert member 14 within the sleeve 42. In some embodiments, the insert member 14 can have the top surface 54 with a rimmed edge 60 facing the first chamber 44. The rimmed edge 60 prevents desiccant material in the first chamber 44 from falling into the second chamber 46 along the front panel 30 and back panel 32. There is separation to isolate the desiccant material away from the collected water.

Figure 3:
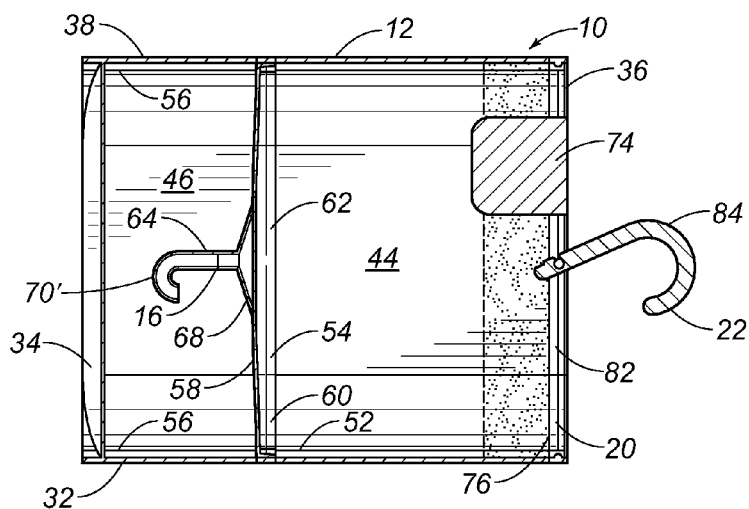
FIG. 3 is a sectional view of another embodiment of the container for storing a desiccant material, according to the present invention.

Embodiments in FIGS. 1-3 and 6 show embodiments of the drain means 16 in the insert member 14. The drain means 16 is placed between the first chamber 44 and the second chamber 46 for fluid connection from the first chamber 44 to the second chamber 46. Water collected by the desiccant material must be removed from the first chamber 44 to the second chamber 46 through the drain means 16. The embodiments of FIGS. 1-3 and 6 show the drain means 16 comprised of an inlet 62 and an outlet 64. The inlet 62 is on the top surface 54 of the insert member 14. FIGS. 2 and 6 show the inlet 62 as a perforated plate 66 with holes for water flow through the drain means 16. The outlet 64 is on an opposite side of the insert member 14, extending from the bottom surface 58 of the insert member 14. The embodiments of FIGS. 1 and 3 show the outlet 64 comprised of a collection chamber 68 in fluid connection with the perforated plate 66, and a tubular member 70 in fluid connection with the collection chamber 68. The tubular member 70 extends downward from the bottom surface 58 of the insert member 14 into the second chamber 46. FIG. 3 shows a variation with a bent tubular member 70' in another embodiment.

The present invention includes the drain means 16 as having a one way flow direction from the first chamber 44 to the second chamber 46. There is no backflow of the water from the second chamber 46 into the desiccant material in the first chamber 44. In some embodiments, the inlet 62 can include a one-way valve. In the embodiment of FIGS. 1-2, the tubular member 70 has a length extended into the second chamber 46. When inverted, the open end of the tubular member 70 rises about the water level so that water cannot flow back through the tubular member 70 and into the first chamber 44. Only a small amount of water already in the tubular member 70 may be subject to back flow into the first chamber 44. Similarly, the bent tubular member 70' of FIG. 3 is another prevention of backflow.

FIGS. 1-2, 4-6 and 3 also show different embodiments of the vapor permeable membrane 18. The membrane 18 is placed across the opened end 36 of the flexible housing 12, covering the first chamber 44 at a top portion 52 of the sleeve 42. In FIG. 3, the membrane 18 is flexible and foldable with a cross-section greater than a cross-section 50 of the sleeve 42. The membrane 18 in FIG. 3 must be folded and tucked in a collapsed configuration. The membrane 18 remains affixed to the front panel 30 and the back panel 32, similar to the sealed end 34. The membrane 18 exposes the desiccant material in the first chamber 44 to the atmosphere. The greater cross-section increases the amount of desiccant material exposed through the opened end 36 of the sleeve 42. The membrane 18 in FIG. 3 can extend into the desiccant material for more absorption of water vapor in the atmosphere. The alternate embodiments of FIGS. 1-2 and 4-6 show the vapor permeable membrane 18 covering the lower surface 76 of the lid member 20 and the first chamber 40. This embodiment of the membrane 18 is a layer on the lid member 20 with a cross-section 78 corresponding to a cross-section 72 of the lid member 20. The membrane 18 still faces the desiccant material in the first chamber 44, and the lid member 20 covers the membrane 18 over the first chamber 44.

Figure 4:
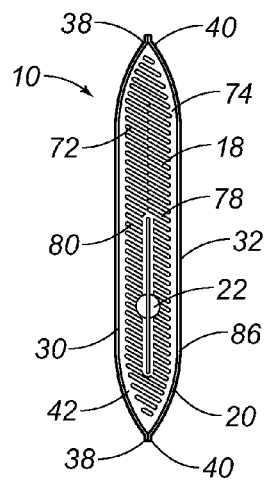
FIG. 4 is a top plan view of an embodiment of the container for storing a desiccant material, showing the upper surface of the lid member.
Figure 5:
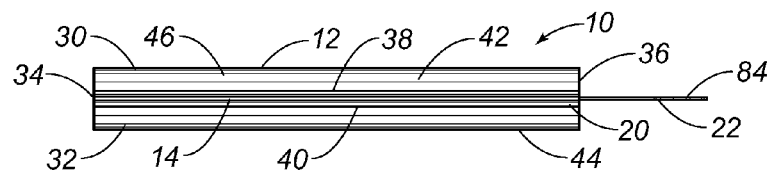
FIG. 5 is a side elevation view of an embodiment of the container for storing a desiccant material, according to the present amendment.

The embodiments of the lid member 20 in FIGS. 1-6 all show the lid member 20 mounted within a top portion 52 of the sleeve opposite the insert member 14 and over the vapor permeable membrane 18. The lid member 20 can be comprised of semi-rigid or rigid material. The lid member 20 can hold the shape of the cross-section of the sleeve 42. The cross-section 72 of the lid member 20 corresponds to a cross-section 50 of the sleeve 42, analogous to the cross-section 52 of the insert member 14 fitting into the sleeve 42. The lid member 20 and the insert member 14 with compatible cross-sections hold the volume of the first chamber 44. There is sealing engagement to the sleeve 42 so that the first chamber 44 is sealed with the desiccant material inside. With the cooperative cross-sections, the lid member 20 can be removably attached to the opened end 36 by friction fit or other means. An adhesive or heat seal can more permanently attach the lid member 20. A friction fit closure would be a more temporary attachment for re-use and refill of the flexible housing 12. Embodiments of the lid member 20 have an upper surface 74 facing outward from the first chamber 44 and a lower surface 76 facing into the first chamber 44. The lid member 20 is vapor permeable so that atmosphere passes through to the membrane 18. FIGS. 2, 4 and 6 show the lid member 20 as a slotted plate 80 with grating for passage of air. The membrane 18 is partially visible through the slotted plate 80 in FIGS. 2, 4 and 6. The embodiments of FIGS. 1-3 and 6 show the lower surface 76 having a rimmed border 82 extending downward into the first chamber 44. The insert member 14 and the lid member 20 hold the desiccant material in the bottom and top of the first chamber 44, respectively.

FIGS. 1-6 show embodiments with the hanging means 22 extendable from the upper surface 74 of the lid member 20 so as to support the flexible housing 12 in a suspended position. The container can be suspended on a closet rod or other horizontal bar. In embodiments of the present invention, the hanging means 22 can be comprised of a hook element 84, having a first position extending upward from the upper surface 74 of the lid member 20 and a second position retracted into the first chamber 44. The hook element 84 pivots between the first position and the second position through a slot 86 in the lid member 20, as shown in FIGS. 2, 4 and 6. FIGS. 1-3 and 6 also show a tab member 88 extending downward from the rimmed border 82 of the lid member 20. The tab member 88 supports the alignment of the back panel 32 along the lid member 20.

The container of the present invention is used to hold desiccant material is a first chamber with means for separating collected water from moisture in the air from the desiccant material. A second chamber is formed to hold the water separate from the desiccant material in the first chamber. The insert member defines these two chambers. The container is assembled by placing the insert member into the sleeve in order to define the two chambers. Desiccant material is filled into the first chamber from the opened end of the sleeve, and then the lid member is secured on the opened end to seal the desiccant material in the first chamber. A drain between the first and second chambers separates the water from the first chamber. There is a vapor permeable membrane between the lid member and the first chamber so that desiccant material is exposed to the atmosphere through the membrane and the lid member.

Embodiments of the desiccant container of the present invention form a specialized pouch. The flexible housing remains squeezable and deformable, while retaining sufficient structure to hold the desiccant material in the first chamber. The flexible housing can be collapsed when there is no desiccant material within the first chamber. The separate compartments for desiccant and water storage are also maintained, even though the flexible housing is collapsible. The insert member and lid member keep a cross-section of the sleeve stable enough to hold desiccant material and water. The semi-rigid or rigid construction of the insert member and lid member hold the volume of the first and second chambers. The compatible cross-sections allow for the sealing engagement of the insert member and lid member within the sleeve. Beyond the formation of two chambers, the interface between the two chambers includes a drainage connection. The one way flow of water characterizes the fluid connection from the first chamber with the desiccant to the second chamber for water collection. The particular drainage connection includes a perforated plate in fluid connection with a collection chamber and tubular member as the outlet. The tubular member reduces backflow and insures one way flow across the drainage connection. The tubular member extends into the second chamber so that water level in the second chamber is below the opening of the tubular member when inverted. Alternatively, the tubular member is bent so that backflow is prevented even without being inverted. The back flow is reduced by this outlet structure.

The embodiments of the desiccant container can be reuseable. After assembling the container and after the second chamber is filled with water, the entire container is disposable. The container and desiccant material can have a one-use only embodiment. Alternatively, the container can be disassembled. The lid member can be detached, so that the desiccant material can be replaced. Also, the insert member can be removed so that the water can be removed from the second chamber by inverting the container. The entire container can be reloaded for another use. With multiple uses, there is a need to store the container. The flexible housing is collapsible, along with some embodiments of the vapor permeable membrane. The folded version of the membrane can also be flattened. The other embodiment of the membrane is attached to the lid member, so the membrane is stored with the lid member without requiring any additional space.

The lid member can also have a hanging means for placement of the container. The hook element extends and retracts so that the container can be placed with or without hanging. For storage purposes, the container can be stacked with the hook element in the retracted position. There is no hook element permanently extended to complicate storing and inadvertent damage to the container.

The foregoing disclosure and description of the invention is illustrative and explanatory thereof. Various changes in the details of the illustrated structures, construction and method can be made without departing from the true spirit of the invention.

I claim:

1. A container for storing a desiccant material, said container comprising:
    a flexible housing having a front panel, a back panel, a sealed end, and a opened end, wherein side edges of said front panel attach to side edges of said back panel so as to form a sleeve, said sealed end at a bottom of said sleeve, said opened end at a top of said sleeve, said sealed end being made integral with said front panel and said back panel at a bottom of said sleeve;
    an insert member mounted within said sleeve so as to form a first chamber and a second chamber within said sleeve, said insert member having a cross-section corresponding to a cross-section of said sleeve, said first chamber being comprised of a top portion of said sleeve, said opened end, and a top surface of said insert member, said second chamber being comprised of a bottom portion of said sleeve, said sealed end, and a bottom surface of said insert member;
    a drain means between said first chamber and said second chamber for fluid connection from said first chamber to said second chamber;
    a vapor permeable membrane placed across said opened end of said flexible housing, covering said first chamber at a top portion of said sleeve,
    a lid member mounted within a top portion of said sleeve opposite said insert member and over said vapor permeable membrane, said lid member having a cross-section corresponding to a cross-section of said sleeve, said lid member having an upper surface facing outward from said first chamber and a lower surface facing into said first chamber; and
    a hanging means extendable from said upper surface so as to support said flexible housing in a suspended position.

2. The container, according to claim 1, wherein said insert member is in sealing engagement to said sleeve, said first chamber being sealed from said second chamber.

3. The container, according to claim 1, wherein said insert member is friction fit within said sleeve.

4. The container, according to claim 1, wherein said insert member is removably mounted with adjustable positioning with said sleeve.

5. The container, according to claim 1, wherein said top surface of said insert member has a rimmed edge facing said first chamber.

6. The container, according to claim 1, wherein said drain means comprises an inlet and an outlet, said inlet being on said top surface of said insert member, said outlet being on said bottom surface of said insert member.

7. The container, according to claim 6, wherein said inlet is comprised of a perforated plate on said top surface.

8. The container, according to claim 6, wherein said outlet is comprised of a collection chamber in fluid connection with said perforated plate, and a tubular member in fluid connection with said collection chamber and extending downward from said bottom surface of said insert member into said second chamber.

9. The container, according to claim 1, wherein said drain means has one way flow direction from said first chamber to said second chamber.

10. The container, according to claim 9, wherein said tubular member has a length to reduce backflow into said first chamber when inverted.

11. The container, according to claim 1, wherein said lid member is in sealing engagement to said sleeve, said top portion of said sleeve being sealed.

12. The container, according to claim 1, said lower surface having a rimmed border extending downward into said first chamber.

13. The container, according to claim 1, wherein said hanging means is comprised of a hook element, having a first position extending upward from said upper surface of said lid member and a second position retracted into said first chamber.

14. The container, according to claim 13, wherein said hook element pivots between said first position and said second position through a slot in said lid member.

15. The container, according to claim 1, further comprising a tab member extending downward from said lower surface of said lid member.

16. A container for storing a desiccant material, said container comprising:
    a flexible housing having a front panel, a back panel, a sealed end, and a opened end, wherein side edges of said front panel attach to side edges of said back panel so as to form a sleeve, said sealed end at a bottom of said sleeve, said opened end at a top of said sleeve, said sealed end being made integral with said front panel and said back panel at a bottom of said sleeve;
    an insert member mounted within said sleeve so as to form a first chamber and a second chamber within said sleeve, said insert member having a cross-section corresponding to a cross-section of said sleeve, said first chamber being comprised of a top portion of said sleeve, said opened end, and a top surface of said insert member, said second chamber being comprised of a bottom portion of said sleeve, said sealed end, and a bottom surface of said insert member;
    a drain means between said first chamber and said second chamber for fluid connection from said first chamber to said second chamber;
    a lid member mounted within a top portion of said sleeve opposite said insert member and over said vapor permeable membrane, said lid member having a cross-section corresponding to a cross-section of said sleeve, said lid member having an upper surface facing outward from said first chamber and a lower surface facing into said first chamber a vapor permeable membrane covering said lower surface of said lid member and said first chamber, and a hanging means extendable from said upper surface so as to support said flexible housing in a suspended position.

17. The container, according to claim 16, wherein said insert member is in sealing engagement to said sleeve, said top portion of said sleeve being sealed.

18. The container, according to claim 17, said lid member being comprised of a slotted plate, said lower surface having a rimmed border extending downward into said first chamber.

19. The container, according to claim 16, wherein said hanging means is comprised of a hook element, having a first position extending upward from said upper surface of said lid member and a second position retracted into said first chamber, and wherein said hook element pivots between said first position and said second position through a slot in said lid member and a slot in said vapor permeable membrane.

20. The container, according to claim 16, further comprising a tab member extending downward from said lower surface of said lid member.

* * * * *